SARAH J. CHADWICK.
Butter-Knives.
No. 154,123. Patented Aug. 18, 1874.
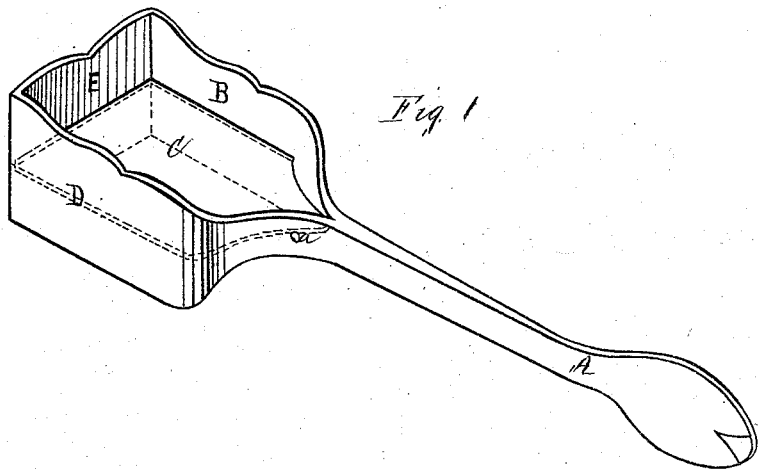
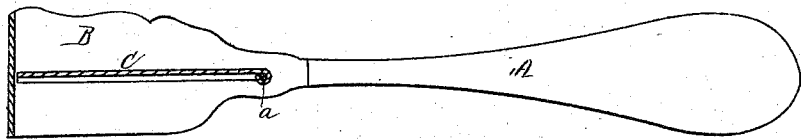
Witnesses
C. A. Shaw
Jacob Bean
Inventor
Sarah J. Chadwick

UNITED STATES PATENT OFFICE.

SARAH J. CHADWICK, OF BRADFORD, ASSIGNOR TO LUCY S. NASH, OF BOSTON, MASSACHUSETTS.

IMPROVEMENT IN BUTTER-KNIVES.

Specification forming part of Letters Patent No. 154,123, dated August 18, 1874; application filed February 10, 1874.

*To all whom it may concern:*

Be it known that I, SARAH JANE CHADWICK, of Bradford, in the county of Essex, State of Massachusetts, have invented a certain new and useful Improvement in Butter-Knives, of which the following is a description sufficiently full, clear, and exact to enable any person skilled in the art or science to which my invention appertains to make and use the same, reference being had to the accompanying drawing, forming a part of this specification, in which—

Figure 1 is an isometrical perspective view of my improved butter-knife. Fig. 2 is a vertical longitudinal section of the same.

Like letters refer to like parts in the different figures of the drawing.

My invention relates to that class of knives in which the handle is not on a line with the cutting-blade; and consists in two such blades mounted in one handle, and connected at the point by a cross-blade, the whole being provided with a hinged follower, as hereinafter more fully set forth, the object being to furnish a neater and more effective implement for the purpose than is now in common use.

The extreme simplicity of my invention renders an elaborate description unnecessary.

In Fig. 1, A is the handle; B D, the side blades, and E the cross-blade, the blades being arranged to form an irregular quadrilateral. C is a follower, constructed of the proper form to fill the space laterally between the blades, and hinged or pivoted to the handle at *a*.

From the foregoing the nature and operation of my invention will be readily understood by all conversant with such matters.

The handle A being grasped with the hand, the blades D B E are forced into the butter until a sufficient quantity has been cut off. The finger is then placed upon the follower E, when, by pressing it down, the butter will be pushed out of the receptacle formed by the blades into the plate preparatory to cutting off another piece.

Having thus described my invention, what I claim is—

A butter-knife provided with the blades D B E and follower C, combined to operate substantially in the manner specified.

SARAH J. CHADWICK.

Witnesses:
   C. A. SHAW,
   JACOB BEAN.